(12) United States Patent
Higginbotham et al.

(10) Patent No.: US 6,862,708 B1
(45) Date of Patent: Mar. 1, 2005

(54) EXTENSIBLE DEVICE COMMAND COMMUTATION ENGINE FOR FORMATTING DEVICE COMMANDS FOR THE CONTROLS OF DEVICES

(75) Inventors: Randal W. Higginbotham, Palm Bay, FL (US); Kenneth C. Whedbee, Jr., Rockledge, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 510 days.

(21) Appl. No.: 09/494,901

(22) Filed: Jan. 31, 2000

(51) Int. Cl.[7] .......................... G06F 15/00; G06F 15/16; G05B 19/18
(52) U.S. Cl. .......................... 715/500; 700/65; 700/250; 700/251; 709/200; 380/270
(58) Field of Search .................. 707/522, 513; 701/13; 712/36; 700/286, 250, 65, 251; 370/352; 709/206, 218, 200; 380/270; 715/500; 340/825.07

(56) References Cited

U.S. PATENT DOCUMENTS

| 5,384,845 | A | * | 1/1995 | Lopatin et al. ............. 380/270 |
| 5,642,467 | A | * | 6/1997 | Stover et al. ............... 700/250 |
| 5,938,757 | A | * | 8/1999 | Bertsch ....................... 712/36 |
| 5,956,487 | A | * | 9/1999 | Venkatraman et al. ...... 709/218 |
| 6,003,070 | A | * | 12/1999 | Frantz ......................... 709/206 |
| 6,192,282 | B1 | * | 2/2001 | Smith et al. ................ 700/286 |
| 6,275,166 | B1 | * | 8/2001 | Del Castillo et al. ... 340/825.07 |

OTHER PUBLICATIONS

Corcoran, P.M., User interface technologies for home appliances and networks, IEEE Consumer Electronics, pp. 679–685.*

* cited by examiner

Primary Examiner—William L. Bashore
(74) Attorney, Agent, or Firm—Sacco & Associates, PA (57) ABSTRACT

An extensible commutation engine for formatting a command buffer in a device commanding system comprises a modifiable list of constants, each constant forming a coded representation of parameters associated with a device command; at least one existing set of instructions for formatting the command buffer in accordance with a device command; and, a modifiable mapping of each set of instructions with a corresponding constant in the modifiable list of constants. Significantly, the commutation engine is extensible to accommodate device commands having new parameters by mapping the new constant with a set of instructions according to said new parameters.

26 Claims, 7 Drawing Sheets

```
;; define LAMP command template
;;
CSPEC NAME=LAMP, DESC=A lamp command controls a lamp on a panel.

;; Command parameter CVAL definitions local to this CSPEC command template.
   ;;
   CVAL:LAMPID\A:LAMP=/ID=\T:N\R:0-5\IMMUTABLE:CDEF\-
   DESC:Lamp number.

CVAL:COLOR\T:XN\R:RED=0-YELLOW=1-GREEN=2-R=0-Y=1-G=2\-
   DESC:Lamp color.

CVAL:XYZ\T:UN\R:0-%ZFFFFFFFF\-
   DESC:This is OSCAR 02049 test.

CVAL:WATTS\T:N\-
   DESC:Lamp wattage, how bright to shine.

CVAL:AMPS\T:N\IMMUTABLE:CDEF\-
   DESC:Lamp amperes, strength of current.

CVAL:CMDID\T:N\R:0-50\-
   DESC:Command ID.

;; Formatting specification.
   ;;

;; REQUIRED values must be supplied by CDEFs or the operator at run time.
   CSPEC REQUIRED=LAMPID
   CSPEC REQUIRED=COLOR ;; OPTIONAL values do not have to be supplied by CDEFs or the operator at
   ;; run time.
   CSPEC OPTIONAL=XYZ,  DEFAULT=%z1234

CSPEC FIELDNAME=ALPHA,    FIELDTYPE=I, VALUE=0 ;; Interger field type, 32 bits
   CSPEC FIELDNAME=BETA,     FIELDTYPE=I, VALUE=LAMPID
   CSPEC FIELDNAME=DELTA,    FIELDTYPE=I, VALUE=RAW(COLOR) ;; LPC intrinsic func
   CSPEC FIELDNAME=EPSILON,  FIELDTYPE=B:4, VALUE=USER_CONVERT(LAMPID, COLOR)
                                                ;; LPC user function CSPEC BREAK  ;; Magnitude Command, break into another formatting buffer CSPEC FIELDNAME=GAMMA, FIELDTYPE=I,  VALUE=XYZ
   CSPEC FIELDNAME=PI,    FIELDTYPE=US, VALUE=WATTS ;; Unsigned short field type
   CSPEC FIELDNAME=SIGMA, FIELDTYPE=US, VALUE=AMPS
   CSPEC FIELDNAME=ZETA,  FIELDTYPE=UL, VALUE=CMDID ;; Unsigned long field type ;; The "POST_FORMAT" keyword allows one to specify an LPC intrinsic or
   ;; LPC user function for post-processing of the formatted command binary.
   ;;
   ;; This example uses CSF User-Defined CVALs.
   CSPEC POST_FORMAT=USER_PROC(UVW, MAG_START_BIT_UVW, MAG_LENGTH_UVW)

CSPEC END   ;; LAMP
```

FIG. 3

[CSPEC][fieldname][fieldtype][value][include][repeat][default]
[post_format][required][optional][break][end]

```
/*--------------------------------------------------------
 * FILE: "cmd_types.h"
 * SUMMARY:
 * "cmd_types.h contains the private data
 * structures used for target device commanding."
 *-------------------------------------------------------*/ ifndef CMD-TYPES_H
define CMD_TYPES_H include "lpc_exp.h"
include "cmt_cmd_types.h"

/* status of command buffer communication between threads */
typedef enum {
    CMD_BUF_INIT_E = 0,
    CDM_BUF_BREAK_E,
    CMD_BUF_COMPLETE_E,
    CMD_BUF_ERROR_E
} CSF_CMDBufStatus_T;

/*--------------------------------------------------------
 * Commanding data structures
 *-------------------------------------------------------*/

/* command system handshaking */
typedef struct {
    int16   iReturnStatus;
    char    szReturnMsg[132];
} CS_ReturnMsg_T;

/* hash table sizes. Note: See css_hashtable.c for discussion on
   the below sizes */ enum NUMBER_OF_HASH_TABLE_ENTRIES  { e101 = 101, e313 = 313,
                                     e727 = 727, e1k = 1-21,
                                     e4k = 4079, e8k = 8053
                                     e16k = 16063, e32k = 32083
                                     e64k = 64157 };

/* enumeration of the commutation parameter names */
typedef enum {
    CSPEC_NO_PARM_C = 0,
    CSPEC_VALUE_C,
    CSPEC_INCLUDE-C,
    CSPEC_REPEAT_C,
    CSPEC_POST_FORMAT_C,
    CSPEC-BREAK_C
} eParms;

/* structure for maintaining the device command opcode.
   The opcode found in this structure is what the target device
   uses to switch to the appropriate method for processing the
   commuted buffer */ typedef struct {
    int32 iOpcode;
    int32 iStartBit;
    int32 iNumBits;
} sDeviceSyncData;

/* enumeration of keywords in the CSPEC syntax */
typedef enum {
    eBrk = 0
} eKeyWords;

/* union of req or opt expressions and RPN stack */
typedef union {
    int8  szexpr[sizeof(struct EXP_RPN_STRUCT)];
    struct EXP_RPN_STRUCT sRpnStkReqOpt;
} uReqOpt;

/* used for storing required and optional parameters */
typedef struct {
    int8   szReqOptName[CMT_CMD_MAX_CSPEC_REQUIRED_NAME_SIZE_C];
    uReqOpt uExpr;
} sReqOptFieldSpec;

/* union of generic string buffer and RPN stack */
typedef union {
    int8  szExpr[CMT_CMD_MAX_CSPEC_VALUE_STRING_SIZE_C];
    struct EXP_RPN_STRUCT rpn;
} uRpn;

/*--------------------------------------------------------
 * CSPEC parameters data structure
 *-------------------------------------------------------*/ typedef struct {
    int32   iOpcode;
    eParms  parmOrder[CMT_CMD_MAX_CSPECS_PER_CMD_TEMPLATE_C];
    uRpn    uvalue;
    int8    szFieldName[CMT_CMD_MAX_CSPEC_FIELDNAME_SIZE_C];
    int8    iSigned;
    int8    szFieldTypeCMT_CMD_MAX_CSPEC_FIELDTYPE_SIZE_C];
    int8    szInclude[CMT_CMD_MAX_CSPEC_INCLUDE_NAME_SIZE_C];
    uRpn    uRepeat;
    uRpn    uPostFmt;
    eKeywords eKeyWord;
} sFieldSpec;

/*--------------------------------------------------------
 * OpCode Commutation Record (OCR)
 *-------------------------------------------------------*/ typedef struct {
    int8    szCspecName[CMT_CMD_MAX_OCR_CMD_NAME_SIZE_C];
    int8    szCspecDesc[CMT_CMD_MAX_OCR_CMD_DESCR_SIZE_C];
    sDeviceSyncData sDeviceSync;
    sReqOptFieldSpec    sReqOptFieldSpec
                        [CMT_CMD_MAX_CSPEC_REQUIRED_PARMS_C];
    sReqOptFieldSpec    sOptFieldSpec
                        [CMT_CMD_MAX_CSPEC_OPTIONAL_PARMS_C];
    sFieldSpec  sCspecField
                [CMT_CMD_MAX_CSPECS_PER_CMD_TEMPLATE_C];
} sOcr;

#endif /* CMD_TYPES_H */
```

FIG. 5B

```
/*+H---------------------------------------------------------------
 *   FILE: "cmd_const.h"
 *----------------------------------------------------------------- */
#ifndef _CMD_CONST_H_
#define _CMD_CONST_H_
/*-----------------------------------------------------------------
 * Opcode Commutation Method identifiers
 *
 *        ............ Special functions (for future use)
 *        |    0 = normal commutation method
 *        |    1 = special functions
 *        |    2 = (not currently used)
 *        |    3 = (not currently used)
 *        |    4 = (not currently used)
 *        |
 *        | ......... Sink Data Format (SDF)
 *        ||    0 = none
 *        ||        1 = big-endian bytes
 *        ||        2 = big-endian bytes w/little-endian bits
 *        ||        3 = little-endian bytes w/little-endian bits
 *        ||        4 = function
 *        ||
 *        || ....... Working Data Size (WDS)
 *        |||    0 = bits
 *        |||    1 = 1 byte
 *        |||    2 = 2 bytes
 *        |||    3 = 4 bytes
 *        |||    4 = long
 *        |||    5 = float
 *        |||    6 = double
 *        |||
 *        ||| ...... Sink Data Size (SDS)
 *        ||||   0 = variable
 *        ||||   1...8 = number of bytes
 *        ||||
 *        XXXX
 *----------------------------------------------------------------- */
/* Big endian types */
#define CSF_OCM_BNOSINK_C      0x0100   /* big endian, no sink value */
#define CSF_OCM_BB1_C   0x0101   /* big endian, un/signed, int:[n], 8 bits */
#define CSF_OCM_BB2_C   0x0102   /* big endian, un/signed, int:[n], 16 bits */
#define CSF_OCM_BB4_C   0x0104   /* big endian, un/signed, int:[n], 32 bits */
#define CSF_OCM_BC_C           0x0111   /* big endian, un/signed, char, 1 byte */
#define CSF_OCM_BSZC_C         0x0110   /* big endian, un/signed, char[n], n bytes */
#define CSF_OCM_BS_C           0x0122   /* big endian, un/signed, short int */
#define CSF_OCM_BI_C           0x0134   /* big endian, un/signed, int */
#define CSF_OCM_BL_C           0x0144   /* big endian, un/signed, long */
#define CSF_OCM_BF_C           0x0154   /* big endian, float */
#define CSF_OCM_BD_C           0x0168   /* big endian, double */
#define CSF_OCM_BSPCFCN_C      0x1100   /* big endian, special functions */

/* Little endian types */
#define CSF_OCM_LNOSINK_C      0x0300   /* little endian, No sink value */
#define CSF_OCM_LB1_C          0x0301   /* little endian, un/signed, int:[n], 8 bits */
#define CSF_OCM_LB2_C          0x0302   /* little endian, un/signed, int:[n], 16 bits */
#define CSF_OCM_LB4_C          0x0304   /* little endian, un/signed, int:[n], 32 bits */
#define CSF_OCM_LC_C           0x0311   /* little endian, un/signed, char, 1 byte */
#define CSF_OCM_LSZC_C         0x0310   /* little endian, un/signed, char[n], n bytes */
#define CSF_OCM_LS_C           0x0322   /* little endian, un/signed, short int */
#define CSF_OCM_LI_C           0x0334   /* little endian, un/signed, int */
#define CSF_OCM_LL_C           0x0344   /* little endian, un/signed, long */
#define CSF_OCM_LF_C           0x0354   /* little endian, float */
#define CSF_OCM_LD_C           0x0368   /* little endian, double */
#define CSF_OCM_LSPCFCN_C      0x1300   /* little endian, include */
#endif /* _CMD_CONST_H_ */
```

FIG. 6

EXTENSIBLE DEVICE COMMAND COMMUTATION ENGINE FOR FORMATTING DEVICE COMMANDS FOR THE CONTROLS OF DEVICES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of device commanding and more particularly to an extensible device command commutation engine.

2. Description of the Related Art

Device commanding systems can be used to control devices, for example specialized test equipment or software and hardware simulators. In the field of satellite command and control, device commanding systems can be used to command a satellite or satellite subsystems contained within the satellite, or ground equipment in the communication path between the satellite and the commanding system. In general, however, a commanding system can command any device controllable by formatted commands communicated by the commanding system to the target device.

A prototypical device commanding system generally can include a selection of commands for controlling the target device. In addition, the prototypical device commanding system can include a command formatting engine for appropriately formatting a chosen command with selected parameters in order to provide to the target device a valid command in a valid format. Finally, the prototypical device commanding system can include a command transmission module for physically transmitting formatted commands to the target device and for ensuring the receipt and acknowledgment by the target device of the formatted commands.

Presently, device commanding systems can process proprietary commanding languages. Using the proprietary commanding language, a user of a device commanding system can control a target device without learning the complexities of the internal command structure of the target device. Specifically, the commanding system can convert a selected command formed using the proprietary commanding language into a command recognizable by the target device. Depending upon the target device, each recognizable command can include a variety of operational parameters.

Still, there exist fundamental problems with present device commanding systems. In particular, because each recognizable command can include a variety of operational parameters having a multiplicity of possible data types and functions, present device commanding systems can be difficult and costly to enhance with additional data types or commands without substantially changing the software architecture of the command database and the command commutation engine. In particular, the commanding code of present device commanding systems can be completely accessible by the applications developer. Furthermore, current device commanding systems can include complex internal functions and data structures. As a result, to extend the functionality of present device commanding engines, an application developer need substantially modify the internal structure and data structures of both the command database and command commutation engine.

SUMMARY OF THE INVENTION

An extensible commutation engine can provide an extensible facility to commutate data streams. Advantageously, an extensible commutation engine can be extended to accommodate new data types and functionality in a device command without necessitating substantial modifications to the internal structure of the command database and command commutation system. Rather, using an extensible commutation engine, device commands having new data types or functions can be added to the commanding system merely through an off-line automated modification to a command database and an offline addition and mapping of a corresponding set of instructions for commutating a command buffer in accordance with the added device command having new data types or functions.

An extensible commutation engine for formatting a command buffer in a device commanding system comprises a modifiable list of constants, each constant forming a coded representation of parameters associated with a device command; at least one existing set of instructions for formatting the command buffer in accordance with a device command; and, a modifiable mapping of each constant with a corresponding set of instructions for formatting the command buffer. Significantly, the commutation engine is extensible to accommodate device commands having new parameters by mapping the new constant with a new set of instructions in accordance with the new parameters.

In the preferred embodiment, the constants are opcodes. Specifically, each constant can comprise a boolean combination of each parameter associated with the device command. Notably, the parameters comprise at least one of a data type and a function. In addition, the sets of instructions can be computer program functions contained in a command formatting program. Finally, the modifiable mapping can be a table in a command formatting program. The table can have a list of the constants. Furthermore, each constant can have at least one corresponding set of instructions. In the preferred embodiment, the table can be implemented using a switch statement which switches on the constants.

A method of extending a commutation engine for formatting a command buffer in a device commanding system can comprise the steps of: defining a constant which is a coded representation of parameters of a device command; specifying a set of instructions for formatting the command buffer according to the parameters; and, mapping the defined constant to the specified set of instructions. The step of mapping can comprise forming a table in the command formatting program, where the table associates the constant with the function. The table can be implemented using a switch statement which switches on the constants.

In the preferred embodiment, the constant can be an opcode. Specifically, the constant can comprise a boolean combination of each parameter associated with the device command. The parameters can comprise at least one of a new data type or function. Additionally, the set of instructions can be a computer program function contained in a command formatting program.

The method can further include the steps of first, defining the device command having the parameters in a command source template. In the preferred embodiment, the device command having the parameters can be defined in the command source template using a command definition language. Second, from the list of constants, a constant can be calculated which corresponds to the parameters. Finally, each of the defined device command, the parameters and the corresponding constant can be compiled into a device command database. The compiling step can comprise the steps of: storing the device command, the parameters and the corresponding constant in a data structure; and, writing the data structure to a record in the device command database. As a result, the commutation engine, in response to a run-time device command, can consult the device command database to identify a constant corresponding to the run-time device command in order to specify a proper set of instructions for formatting the command buffer, where the specified proper set of instructions maps to the constant in the mapping step.

In an alternative embodiment, the method can further include the steps of: inserting the defined constant and specified set of instructions in a shared object library; and, dynamically linking to the shared object library when compiling the commutation engine.

An extensible commutation engine in accordance with the inventive arrangements can comprise a list of constants forming a coded representation of parameters associated with a device command; a device command database having therein device commands and associated parameters; a device command database generator; source code for a command formatter; and, a command formatter for formatting a command buffer responsive to a selected device command in the device command database. The device command database generator can comprise means for parsing the command source template into a device command name and corresponding parameters; means for identifying in the list of constants a constant corresponding to the device command having the parameters; and, means for storing the device name, the parameters and the corresponding constant in a device command record in the device command database. In the preferred embodiment, the constants can be opcodes. Specifically, the coded representation can comprise a boolean combination of each parameter corresponding to a device command. In addition, the parameters can comprise at least one of a new data type and function.

In an extensible commutation engine, the device command generator can associate the device commands and corresponding parameters with the constants and can compile the device commands, corresponding parameters and the constants in the device command database. Moreover, the source code can have sets of instructions for formatting a command buffer in accordance with a device command and corresponding parameters, and a mapping of the sets of instructions with the constants. In the preferred embodiment, the mapping can be implemented in the source code using a switch statement which switches on the constants. Finally, the command formatter can be compiled from the source code. In the preferred embodiment, the command formatter can identify constants in the device command database associated with selected device commands and can format the command buffer in accordance with a set of instructions mapping to the identified constant.

Advantageously, the commutation engine can be extended with a device command having new corresponding parameters by first calculating and adding a new constant to the list of constants and mapping in the source code the new constant with a set of instructions. Second, the device command having new corresponding parameters and the new constant can be compiled into the device command database. Third, the command formatter can be recompiled using the modified source code.

The extensible commutation engine can further comprise a command source template defining a device command having parameters. The device command having the parameters can be defined in the command source template using a command definition language. The device command database generator can compile the command source template into a device command record having therein the device command, parameters and a constant corresponding to the device command having the parameters.

In operation, the commutation engine, in response to a run-time device command, can retrieve from the device command database a device command record corresponding to the run-time device command in which the commutation engine can identify the stored constant corresponding to the run-time device command in order to specify a proper set of instructions for formatting the command buffer, the specified proper set of instructions mapping to the constant in the command formatter.

BRIEF DESCRIPTION OF THE DRAWINGS

There are presently shown in the drawings embodiments which are presently preferred, it being understood, however, that the invention is not limited to the precise arrangements and instrumentalities shown.

FIG. 3 is an exemplary command template source file used to extend the command commutation system of FIG. 2.

FIG. 5B is an ANSI C prototype of a data structure for storing a command interpreted by the command database generator shown in FIG. 2.

FIG. 6 is an ANSI C header file defining opcodes for use with the present invention.

DETAILED DESCRIPTION OF THE INVENTION

A device commanding system having an extensible command commutation system in accordance with the inventive arrangements can include a set of tools which together provide the capability to define device commands, generate command databases, and format and transmit the device commands to various types of target devices. In the preferred embodiment, the device commanding system can be a satellite commanding system, for example, the OS/COMET® satellite command and control system manufactured by Exigent International, Inc. of Melbourne, Fla. However, the invention is not limited in this regard. Rather, the invention can be incorporated in any command system for commanding a target device.

Figure 1:
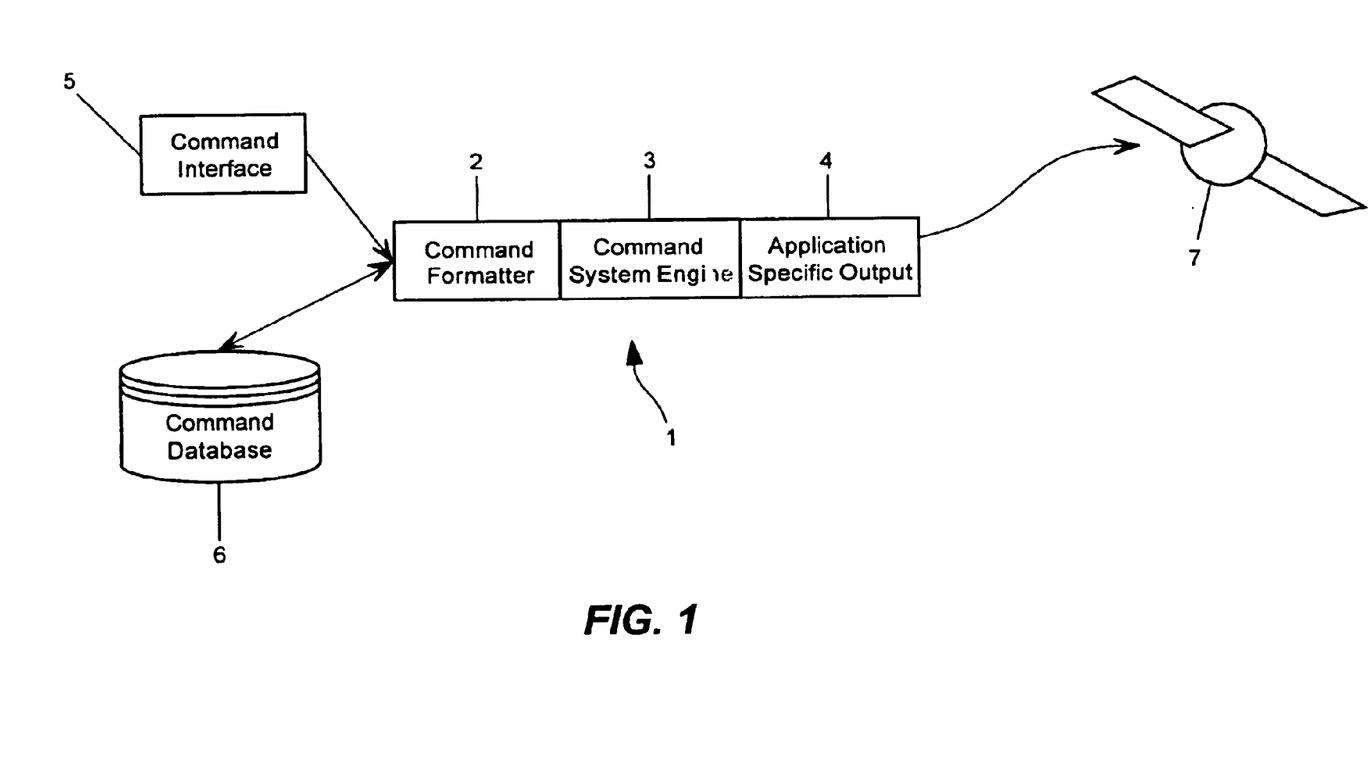
FIG. 1 is a pictorial representation of a satellite commanding system for use with the present invention.

FIG. 1 illustrates an exemplary device commanding system 1 for use in satellite command and control. As shown in FIG. 1, a user can input a satellite command in the command interface 5. The command can be passed from the command interface 5 to the command commutation engine, also known as a command formatter 2. The command formatter 2 can consult the command database 6 both to ensure the validity of the command and to determine an appropriate format for the selected command. Using the determined appropriate format, the command formatter 2 can format the command into a command buffer and pass the command buffer to the command system engine 3. The command system engine 3 can encapsulate the command buffer in a packet control message (not shown) before passing the packet control message to the application specific output module 4. The application specific output module 4 can ultimately transmit the packet control message containing the command buffer to the target device in the satellite 7.

The device commanding system can include tools for defining, formatting and transmitting device commands. These tools can include a command definition language used to define device command templates and parameters, an off-line command database generator used to compile these device command formats and parameters into a run-time device command database, and run-time processes which can format individual device commands in real time into a command buffer, encapsulate the command buffer into a command packet suitable for transmission to the target device, and control the transmission of the encapsulated device commands to the target device. The present invention relates to the command formatting, or commutation portion, of the device commanding system.

The inventive extensibility of the present invention involves the bifurcation of the command commutation process into an off-line portion and a run-time portion. The off-line portion can include an off-line determination, or compiling, of a command definition syntax and a subsequent calculation of an opcode. The command definition syntax can provide information to the compiler necessary for the compiler to calculate the opcodes. Actual commutation can occur at run-time by identifying an opcode corresponding to a device command and commutating a command buffer according to a commutation method associated with the opcode.

An opcode is an acronym for "Operational Code". The opcode links the off-line definition of a device command with the run-time formatting of the device command. Notably, an opcode is a constant. In the preferred embodiment, opcodes are hexadecimal values, pre-defined according to a boolean formula specified in the source code of the device commanding system and shown, both in the comments and by example in the C header file listed in FIG. 6.

In the preferred embodiment, the opcode is defined to be the logical-or of the sink data size of the device command, the wording data size of the device command, the sink data format of the device command, and the special functions indicator of the device command. Notwithstanding, the invention is not limited in this regard. Rather, the inventive spirit of the extensible commutation engine encompasses the notion of determining an opcode for a device command according to the parameters of the device command.

Figure 2:
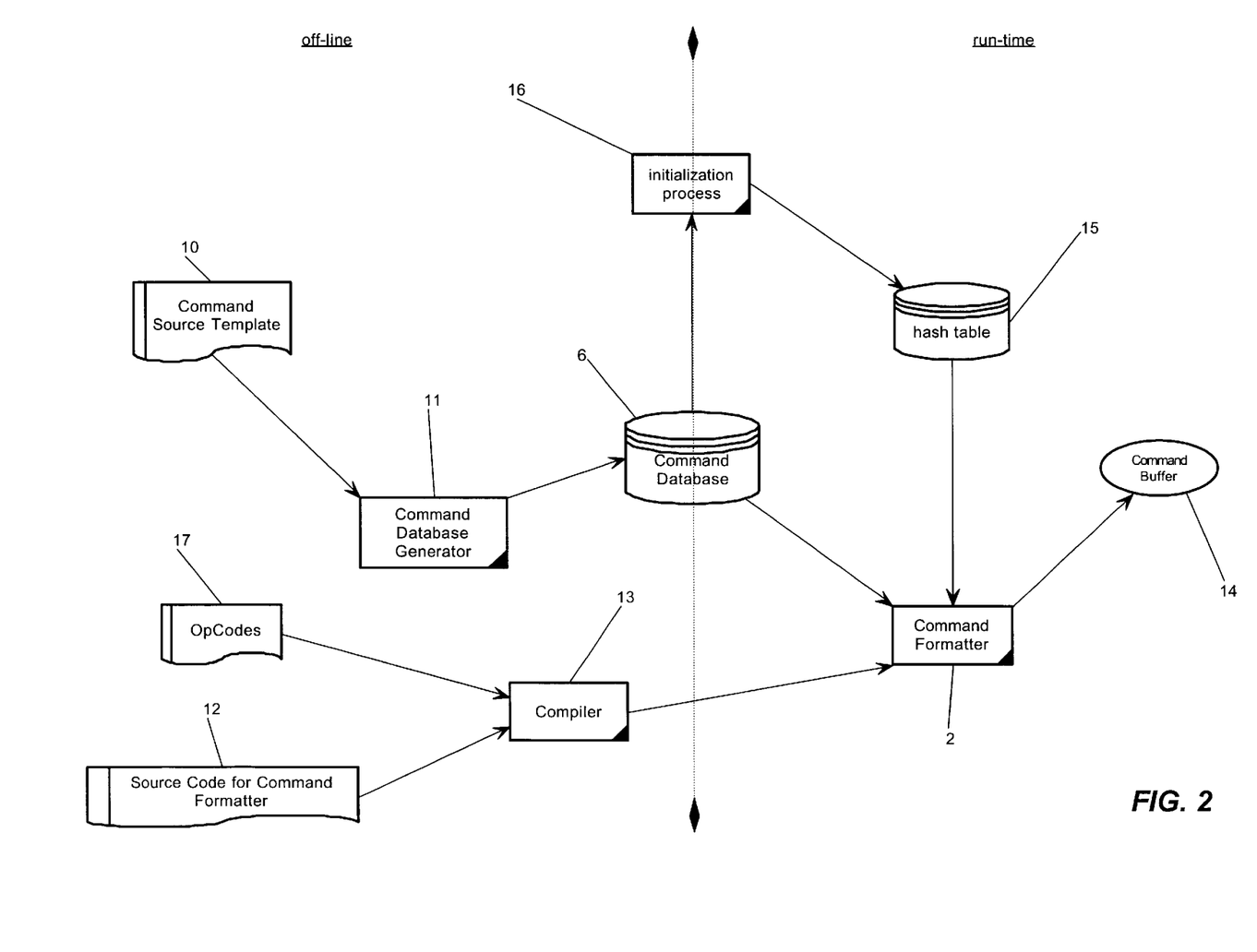
FIG. 2 is a schematic representation of a command commutation system for use with the present invention.

The run-time portion can include a mapping of each opcode to a set of computer instructions for formatting an appropriate command buffer. Specifically, the command formatter 2 can identify an opcode corresponding to a device command. Subsequently, the command formatter 2 can select an appropriate formatting method associated with identified opcode. Thus, each set of instructions mapping to a corresponding opcode or opcodes is responsible for actually building, or commutating, a command buffer.

FIG. 2 is a schematic representation of an extensible command commutation engine for use with the present invention. A command formatter 2, commonly referred to as a commutation engine, as shown in FIG. 2, is designed and implemented such that it can be easily extended or scaled without loss of performance as future requirements materialize. The off-line portion of the extensible command commutation engine, with regard to the extensible components, can include command template source files 10 defining device commands, a command database generator 11 for compiling the command template source file 10 into the command database 6, an opcode header file 17 for defining opcodes, and source code 12 which both includes sets of instructions for formatting the command buffer 14 in accordance with the data type and functionality of a device command, and maps the sets of instructions with corresponding opcodes. The source code 12 and the opcode header file 17 can be compiled into the command formatter 2 using a conventional programming language compiler 13. In the preferred embodiment, the source code 12 is written using the C programming language, however the invention is not limited in this regard. Rather, any suitable programming language can be used to code the command formatter 2.

Advantageously, the command formatter 2 can be extended without modifying the architecture of the device commanding system 1. To extend the command formatter 2, in accordance with the inventive arrangements, a new opcode can be added to the opcode header file 17 if necessary to accommodate a new data type or function. Specifically, a new opcode may be required if the data type or function to be added implicates an opcode not already included in the opcode header file 17. Subsequently, an applications developer or end user can define a device command in a device command template source file 10 using a command definition language. An exemplary command template source file 10 is shown in FIG. 3. The command template source file 10, as shown in FIG. 3, defines a command for controlling a lamp on a target device. In the preferred embodiment, the command definition language is a subset of the OS/COMET Command Language® (CCL).

Figure 4:
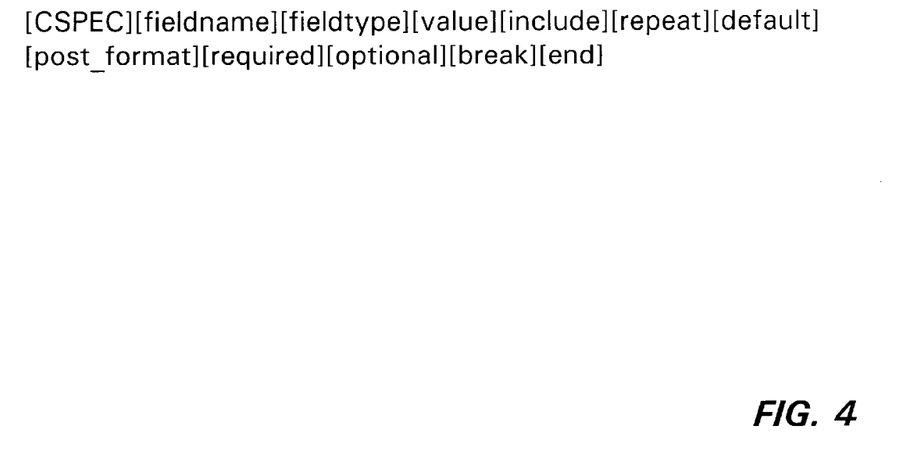
FIG. 4 is a command template for interpretation by the command database generator shown in FIG. 2.

FIG. 4 illustrates the proper syntax for defining a device command using the command definition language. As shown in FIG. 4, a typical syntax from the command definition language includes a directive and associated parameters. In the command definition language, CSPEC is an acronym for "command specification". For example, for the command definition, "CSPEC NAME=BLK_UPLOAD, DESC=Memory upload example," CSPEC is the directive and NAME and DESC are parameters to the directive. In the prefered embodiment, several parameters to the CSPEC directive have been defined. While the FIELDTYPE parameter can define the data type of a device command, INCLUDE, REPEAT and POST-FORMAT can provide for additional functionality to an existing device command. More particularly, the FIELDTYPE parameter is a means for describing data in a device commanding buffer, for example bits of data, a single character, one byte of data, or a signed value. In the command formatter 2 of FIG. 2, the FIELDTYPE parameter can support most data types typically found in common high level software programming languages, for example C, C++ and Java. However, theoretically, an infinite number of data types can exist or be created. As a result, in the present invention, the FIELDTYPE parameter can be extended to accommodate future data types.

With regard to the functional parameters, INCLUDE, REPEAT and POST-FORMAT, each can add functionality to an existing device command. Rather than indicating a value or the data type of a value to the command formatter 2 at run-time, these functional parameters extend the functionality of the runtime command formatter 2 by defining the further processing of data. For example, if the REPEAT parameter is specified, at run-time, the command formatter 2 can REPEAT the last command formatting step, concatenating the calculated value to the end of the command string in the command buffer 14.

Subsequent to the application developer's or user's definition of a device command in a command template source file 10, a command template source file compiler, or device command generator 11, can compile the high level command definition language contained in the command template source file 10 into application code capable of being comprehended by the run-time command formatter 2. More particularly, the device command generator 11 can parse the command template source file 10 using conventional parsing techniques. The device command generator 11 both can ensure the syntax of a defined device command and can calculate the corresponding opcode using the same cookbook formula employed in the opcode header file 17.

Figure 5A:
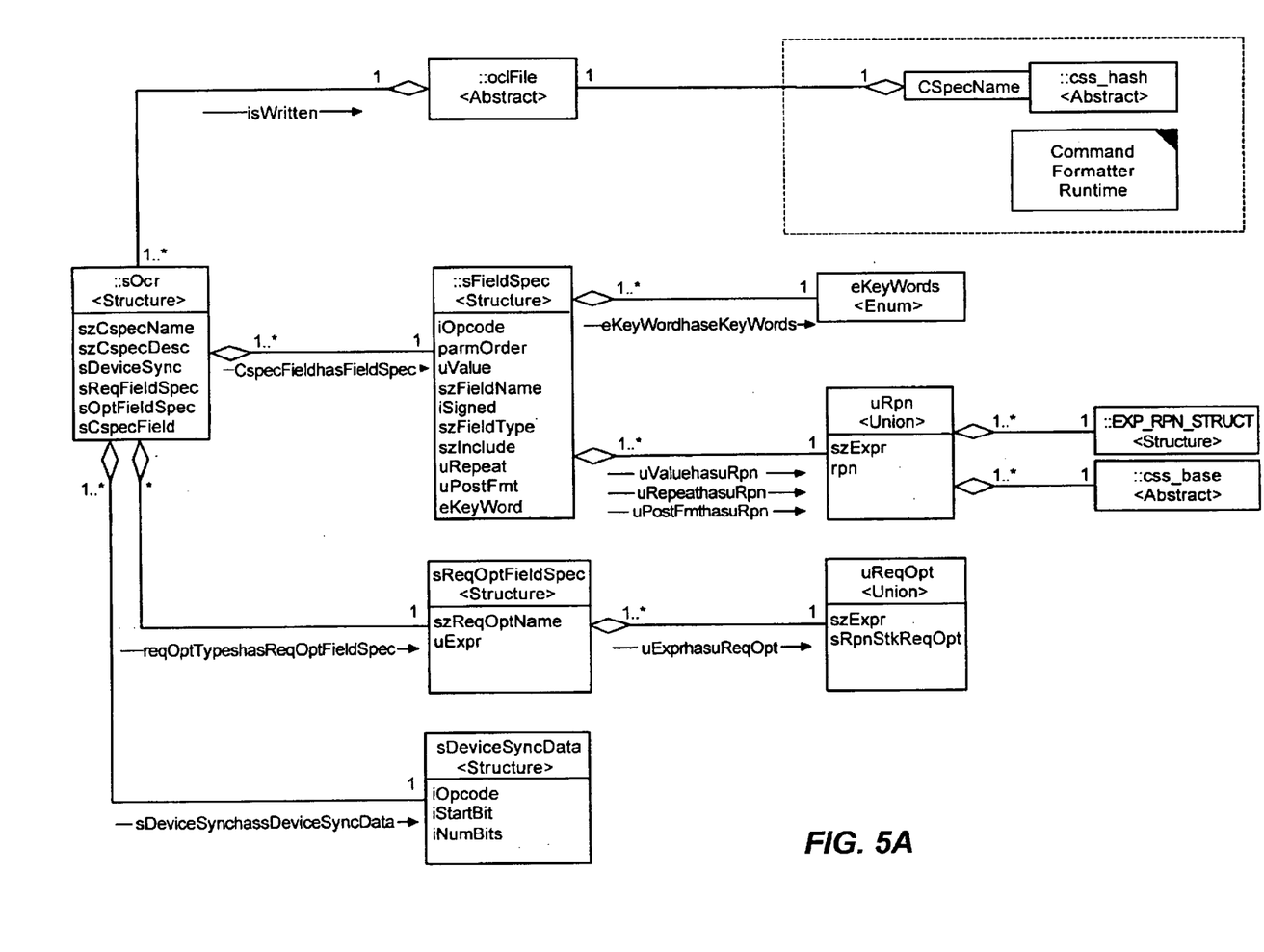
FIG. 5A is an object diagram of a data structure for storing a command interpreted by the command database generator shown in FIG. 2.

The device command generator 11 can interpret and process each parsed CSPEC directive in the command template source file 10 into a data structure referred to as an Opcode Commutation Record (OCR). FIGS. 5A and 5B illustrate a data structure for storing an OCR in the preferred embodiment. Specifically, FIG. 5A is a UML diagram of the preferred OCR data structure while FIG. 5B is exemplary C source code of a data structure for storing an OCR. Still, one skilled in the art will recognize that the invention is not limited in this regard. Rather, any suitable data structure can be utilized to represent a device command definition in the command database 6.

One or more OCRs can be compiled into the command database 6. In particular, the OCRs, as represented in the preferred data structure, can be written into the command database 6 using conventional file manipulation techniques well known in the C programming language. Advantageously, as shown in FIGS. 4B and 4C, the OCRs provide to the command formatter 2, at run-time, the information required by the command formatter 2 to properly build a command buffer 14 for a selected device command.

Significantly, in the preferred embodiment, opcodes inherently permit the extension of the command formatter 2. Specifically, when an application developer or user adds a new data type or function to a device command, the application developer or user merely defines a new opcode in the opcode header file 17, adds a corresponding reference in the device command generator 11, and, in the source code 12 for the command formatter 2, the application developer can map the new opcode to either a new or existing set of instructions for appropriately formatting the command buffer 14.

Once the command template source file 10 has been compiled into an OCR in the command database 6, a corresponding set of instructions for formatting the command buffer 14 can be added to the source code 12 of the run-time command formatter 2. In particular, whether the extension to the device command adds a new data type or new functionality, a new set of instructions must be defined in the source code 12 for the command formatter 2 in order to perform the task of commutating the new data type or functionality in the command buffer 14. In addition, the newly added opcode can be included in a list of opcodes mapping to the sets of instructions in the command formatter 2. Notably, the set of instructions corresponding to the new field type or function can be associated in the list with the new opcode. In the preferred embodiment, the list of opcodes in the source code 12 can be a switch-statement in which each opcode is referenced in a corresponding case-statement. In consequence, at run-time, the command formatter 2 can execute an appropriate set of instructions in response to a receiving a corresponding opcode.

As shown in FIGS. 5A and 5B, each OCR can contain several opcodes. Therefore the command formatter 2 includes functionality to retrieve all opcodes in an OCR in order to correctly build a complete command buffer 14. Specifically, a looping construct, for example a while-loop, in the source code 12 can be employed in which each opcode retrieved from the OCR is mapped against a corresponding constant in the switch-statement. Subsequently, an appropriate set of instructions can be referenced. As a result, to extend the commutation engine in the case of an OCR having multiple opcodes, the new constant must be added to the loop in the source code 12 so that when the opcode is compared against the constant in the switch-statement, the command formatter 2 can identify the new opcode and the appropriate set of instructions for commutating the command buffer 14 can be executed. Once written, the source code 12, including the added set of instructions and modified list of opcodes, can be recompiled into the object code of the command system formatter 2 using the compiler 13.

In the preferred embodiment, each set of instructions in the command formatter 2 can be written in a modular fashion and can have a similar style with other related sets of instructions with the exception of application specific processing. For example, one set of instructions may be used to commutate four bytes of data—data type int. Another set of instructions may be used to commutate two bytes of data—data type short. In this example, the overall layout of both sets of instructions can differ only with regard to mission specific processing. Consequently, software reuse techniques well-known in the art can be employed for rapid development. Additionally, subsets of the instructions can be stored in library routines for reuse by several sets of instructions.

The extension of the device commanding system 1 can be implemented within the command database generator 11 and command formatter 2, however the invention is not limited in this regard. Rather, in an alternative embodiment, the new field type or function can be added through a shared object library—a common construct in software development. Using the shared object interface, an end user can define a new opcode and write a corresponding set of instructions, inserting both into the shared object library. When compiling the command system formatter 2, the compiler can dynamically link to the shared object library to get the field type or functional parameter.

Returning now to FIG. 2, subsequent to the extension of the command formatter 2, the run-time portion of the extensible commutation engine can be executed and device commands can be sent to a target device through, among other means, a command interface 5 as shown in FIG. 1. Once a device command has been received through the command interface 5, the command formatter 2 can retrieve and process the appropriate OCR from the command database 6. Notably, to retrieve the appropriate OCR corresponding to the selected device command from the command database 6, the selected device command name can be hashed using well-known hashing techniques in order to determine an index into the command database 6. The hash table 15 itself, which can be generated based upon the names of the device commands stored in the command database 6, can be generated during the initialization process 16 of the command formatter 2 during startup of the device command system 1. The command formatter 2 can use the device command name as a key into the hash table 15 in order to identify a corresponding OCR to be retrieved from the command database 6. Subsequently, the corresponding OCR can be retrieved from the command database 6. The command formatter 2 can identify in the OCR each opcode. Subsequently, the opcode can be mapped to a corresponding set of instructions. Using this mapping, the command formatter 2 can select an appropriate set of instructions for formatting the command buffer 14.

In consequence, the above-described extensible commutation engine can provide an extensible facility to commutate data streams. Advantageously, an extensible opcode-based commutation engine can be extended to accommodate new data types and functionality in a device command without necessitating substantial modifications to the internal structure of the command database and command commutation system. Rather, using an extensible opcode-based commutation engine, device commands having new data types or functions can be added to the commanding system merely through an off-line modification to the command database 6 and an off-line addition and mapping of a corresponding commutation set of instructions to the command formatter 2.

What is claimed is:

1. An extensible commutation engine for formatting a command buffer in a device commanding system comprising:

a modifiable list of constants, each constant forming a coded representation of parameters associated with a device command;

at least one set of existing instructions for formatting said command buffer in accordance with a device command; and, a modifiable mapping of each said constant in said modifiable list with a corresponding set of instructions for formatting said command buffer in accordance with a device command;

wherein said commutation engine is extensible to accommodate new device commands having new parameters by mapping a new constant which has been added to said modifiable list with a set of instructions for formatting said command buffer in accordance with said new device command having new parameters.

2. The extensible commutation engine according to claim 1, wherein said constants are opcodes.

3. The extensible commutation engine according to claim 1, wherein each constant comprises a boolean combination of each parameter associated with said device command.

4. The extensible commutation engine according to claim 1, wherein said parameters comprise at least one of a data type and a function.

5. The extensible commutation engine according to claim 1, wherein said sets of instructions are computer program functions contained in a command formatting program.

6. The extensible commutation engine according to claim 1, wherein said modifiable mapping is a table in a command formatting program, said table having a list of said constants and at least one corresponding set of instructions for each said constant.

7. The extensible commutation engine according to claim 6, wherein said table is implemented using a switch statement which switches on said constants.

8. A method of extending a commutation engine for formatting a command buffer in a device commanding system comprising the steps of:

defining a constant which is a coded representation of parameters of a device command;

specifying a set of instructions for formatting said command buffer according to said parameters; and mapping said defined constant to said specified set of instructions.

9. The method according to claim 8, wherein said constant is an opcode.

10. The method according to claim 8, wherein said constant comprises a boolean combination of each parameter associated with said device command.

11. The method according to claim 8, wherein said parameters comprise at least one of a new data type and a function.

12. The method according to claim 8, wherein said set of instructions is a computer program function contained in a command formatting program.

13. The method according to claim 12, wherein said step of mapping comprises forming a table in said command formatting program, said table associating said constant with said function.

14. The method according to claim 13, wherein said table is implemented using a switch statement which switches on said constants.

15. The method according to claim 8, further comprising the steps of:

defining said device command having said parameters in a command source template;

from said list of constants, calculating a constant corresponding to said parameters; and, compiling said defined device command, said parameters and said corresponding constant into a device command database, whereby said commutation engine, in response to a run-time device command, can consult said device command database to identify a constant corresponding to said run-time device command in order to specify a proper set of instructions for formatting said command buffer, said specified proper set of instructions mapping to said constant in said mapping step.

16. The method according to claim 15, wherein said device command having said parameters is defined in said command source template using a command definition language.

17. The method according to claim 15, wherein the compiling step comprises the steps of:

storing said device command, said parameters and said corresponding constant in a data structure; and, writing said data structure to a record in said device command database.

18. The method according to claim 8, further comprising the steps of:

inserting said defined constant and specified set of instructions in a shared object library; and, dynamically linking to said shared object library when compiling said commutation engine.

19. An extensible commutation engine comprising:

a list of constants, each constant forming a coded representation of parameters associated with a device command;

a device command database having therein device commands and associated parameters;

a device command database generator for associating said device commands and associated parameters with said constants and compiling said device commands, associated parameters and said constants in said device command database;

source code for a command formatter, said source code having sets of instructions for formatting a command buffer in accordance with a device command and corresponding parameters, and a mapping of said sets of instructions with said constants; and, a command formatter for formatting a command buffer responsive to a selected device command in said device command database;

said command formatter compiled from said source code;

said command formatter identifying constants in said device command database associated with selected device commands;

said command formatter formatting said command buffer in accordance with a set of instructions mapping to said identified constant, whereby said commutation engine is extensible to accommodate a device command having new corresponding parameters by first calculating and adding a new constant to said list of constants and mapping in said source code said new constant with a set of instructions, second recompiling said device command having new corresponding parameters and said new constant in said device command database, and third recompiling said command formatter using said modified source code.

20. The extensible commutation engine according to claim 19, wherein said constants are opcodes.

21. The extensible commutation engine according to claim 19, wherein said coded representation is a boolean combination of each parameter corresponding to said device command.

22. The extensible commutation engine according to claim 19, wherein said parameters comprise at least one of a new data type or function.

23. The extensible commutation engine according to claim 19, wherein said mapping is implemented in said source code using a switch statement which switches on said constants.

24. The extensible commutation engine according to claim 19, further comprising a command source template defining a device command having new parameters, whereby said device command database generator can compile said command source template into a device command record having therein said device command, new parameters and a constant corresponding to said device command having said new parameters.

25. The extensible commutation engine according to claim 24, wherein said device command database generator comprises:

means for parsing said command source template into a device command name and corresponding new parameters;

means for identifying in said list of constants a constant corresponding to said device command having said new parameters; and, means for storing said device name, said new parameters and said corresponding constant in a device command record in said device command database, whereby said commutation engine, in response to a run-time device command, can retrieve from said device command database a device command record corresponding to said run-time device command in which said commutation engine can identify said stored constant corresponding to said run-time device command in order to specify a proper set of instructions for formatting said command buffer, said specified proper set of instructions mapping to said constant in said command formatter.

26. The extensible commutation engine according to claim 24, wherein said device command having said new parameters is defined in said command source template using a command definition language.

\* \* \* \* \*